United States Patent [19]
Svendsen

[11] Patent Number: 5,855,363
[45] Date of Patent: Jan. 5, 1999

[54] SPRING AND REBOUND SUPPORT FOR BICYCLE SEAT

[76] Inventor: Mark G. Svendsen, 402 b Corona del Mar, Santa Barbara, Calif. 93103

[21] Appl. No.: 726,375

[22] Filed: Oct. 4, 1996

[51] Int. Cl.[6] ........................................................ B62J 1/02
[52] U.S. Cl. ............................ 267/132; 267/131; 267/221
[58] Field of Search ..................................... 267/131, 132, 267/34, 64.22, 64.26, 221; 297/202, 205, 207, 208

[56] References Cited

U.S. PATENT DOCUMENTS

| | | | |
|---|---|---|---|
| 4,830,398 | 5/1989 | Williams | 267/64.26 |
| 4,934,668 | 6/1990 | Vassmer | 267/120 |
| 5,044,648 | 9/1991 | Knapp . | |
| 5,188,345 | 2/1993 | Siegner | 267/131 |
| 5,301,974 | 4/1994 | Knapp | 188/322.17 |

OTHER PUBLICATIONS

"Marketplace" advertisement, Spring, Summer and Fall issue, 1996; advertisement by Kei Bicycle Suspension Products.

Primary Examiner—Robert J. Oberleitner
Assistant Examiner—C. T. Bartz

[57] ABSTRACT

A spring support assembly for a bicycle seat, having a lower cylindrical post, an upper post concentrically disposed within the lower post and vertically slidable within it, the two posts together providing an enclosed spring chamber, a gas spring disposed in the spring chamber, the gas spring being pre-loaded to prevent reaction to a force of less than a predetermined magnitude, a metallic compression spring surrounding the gas spring in a concentric relation, and both spring devices supporting the upper post at all times so that all phases of the spring reaction occur as a composite function of the two spring devices.

1 Claim, 2 Drawing Sheets

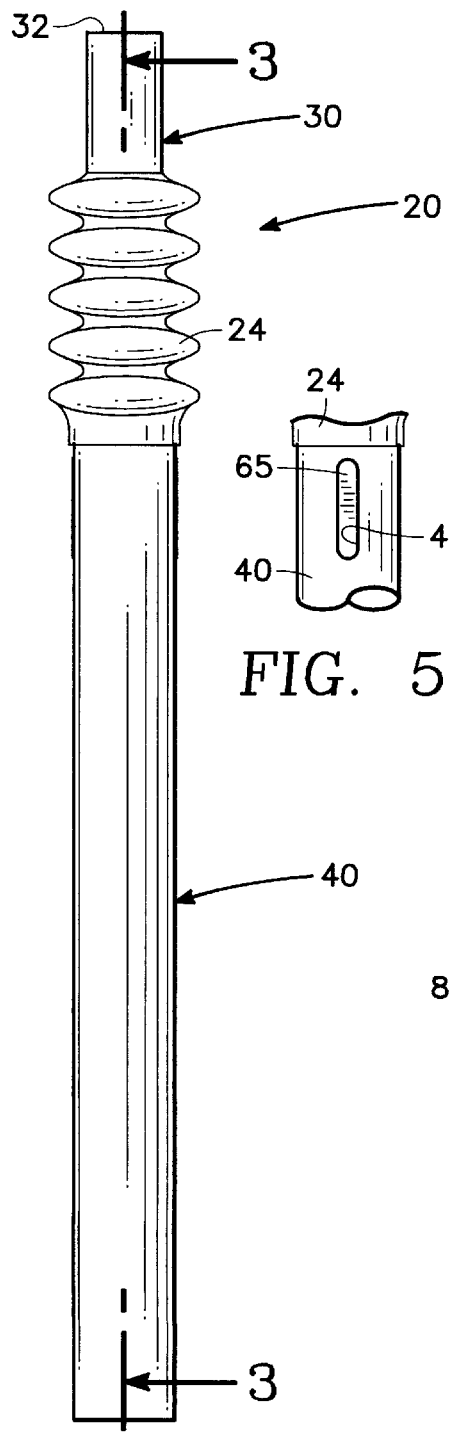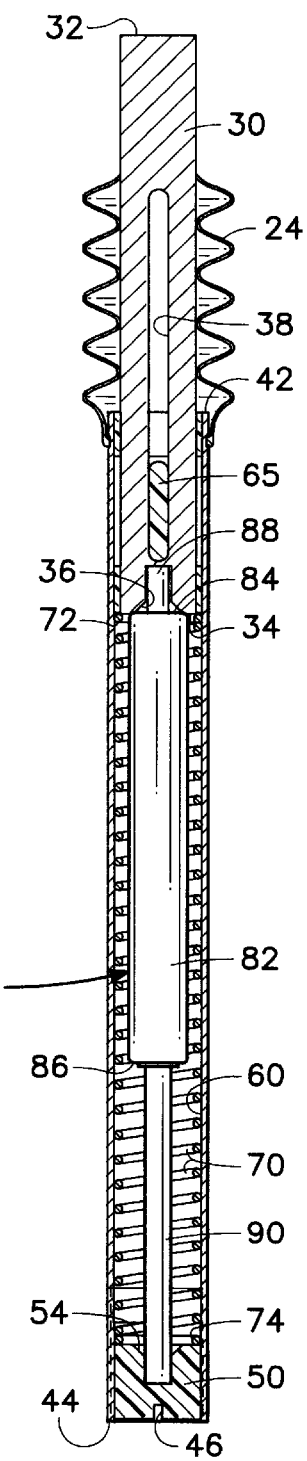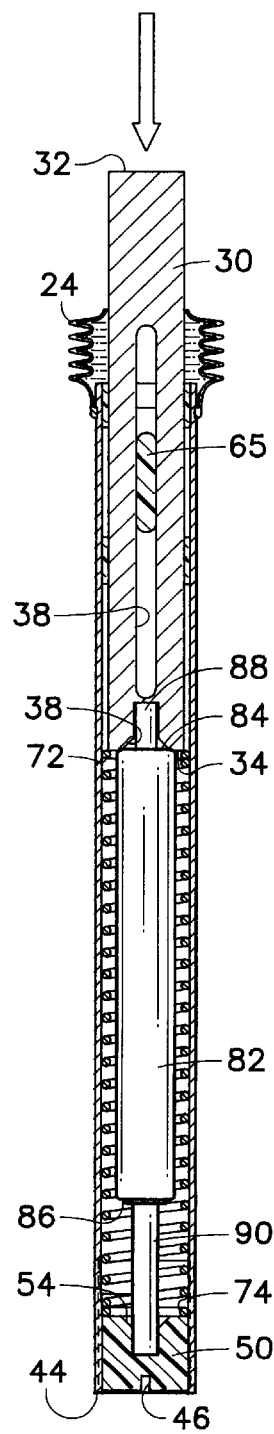
FIG. 2   FIG. 3   FIG. 4   FIG. 5

SPRING AND REBOUND SUPPORT FOR BICYCLE SEAT

FIELD OF THE INVENTION

The present invention relates to bicycles.

BACKGROUND OF THE INVENTION

It is important to a bicycle rider to have a seat that will remain comfortable despite either small or large bumps that may be encountered during the course of a ride.

A bicycle seat must be supported from the frame of the vehicle, the pertinent portion of which is generally in the form of a hollow tube. The assembly that supports the seat then consists mainly of two parts: an upper or inside post having its upper end fixedly attached to the seat; and a hollow lower or outside post that is inserted into the hollow frame member, and into whose upper end the upper post is then slidably inserted. The lower or outer post is fixed to the frame with regard to both rotation and vertical movement. The position of the upper post relative to the lower post is made adjustable, however, so that the seat can be placed at whatever height above the vehicle is most convenient for the rider.

It has been well known to utilize some kind of a spring support inside the lower or outer post in order to resiliently support the upper post and hence the rider. Previously known mechanisms have not been fully satisfactory, however.

What the rider needs to have beneath the bicycle seat is a suspension system that will provide firm support under normal conditions while riding on smooth surfaces, but which will drop downwardly whenever a large bump is encountered. If such vertical movement were not provided, the full impact of the bump would be transmitted to the rider's body as a sharp upward force.

The spring action occurs in three major phases, as follows: the pre-load, if any, which an initial load or force applied to the seat must overcome before any downward movement of the seat will take place; the spring strength, or the force of the spring action that resists the downward movement after it occurs; and the rebound characteristic, which includes both strength, speed, and smoothness of the upward return movement.

If the pre-load is too great it will cause the rider to feel that the support provided by the seat is stiff and uncomfortable.

If the pre-load is too small the seat will move down a large distance merely because the rider sits upon it. That will diminish the amount of downward travel that could later be available for absorbing vertical shocks.

If the spring strength is too great, too much of the force of a bump will be transmitted to the body of the rider.

If the spring strength is too small, the seat will bob up and down excessive distances in response to small bumps.

The rebound characteristic is also very important, because it can be either too fast or too slow for the comfort and convenience of the rider, and may also involve oscillatory movement, depending upon the type of spring system that is used.

SUMMARY OF THE INVENTION

The present invention provides a spring and rebound support or impact isolation suspension system for the bicycle seat that optimizes the characteristics in a manner that is most satisfactory to the person riding the bicycle.

Specifically, a pre-load of desired amount is provided, so that the seat will not be depressed merely by sitting on it.

The spring strength is established at an appropriate level, so that the downward movement of the seat will absorb momentum of the impact at a rate comfortable for the rider.

The rebound characteristic is established so that upward movement of the seat after an impact is not too rapid. At the same time, provision is made to avoid oscillation of the spring system, by means of the oscillation damping characteristic of the hydraulic orifice in the gas spring unit.

In the presently preferred form of the invention all of these things are accomplished by means of a spring assembly placed within the hollow lower post that includes a gas spring having a cylindrical housing and a plunger extending longitudinally from one end of the housing, the gas spring being pre-loaded to a predetermined level; and an elongated metallic spring that is circumdisposed about the gas spring in substantially coextensive relation therewith.

DRAWING SUMMARY

FIG. 2 is an enlarged external elevation view of the spring support assembly by itself;

FIG. 3 is a vertical cross-sectional view taken on line 3—3 of FIG. 2, showing in accordance with the presently preferred form of the invention an elongated metallic spring circumdisposed about a gas spring inside the lower post;

FIG. 4 is a view similar to FIG. 3, but showing the assembly when downwardly depressed;

FIG. 5 is a fragmentary view of a portion of the lower or outer post showing a rotational alignment opening;

DESCRIPTION OF PREFERRED EMBODIMENT

Figure 1:
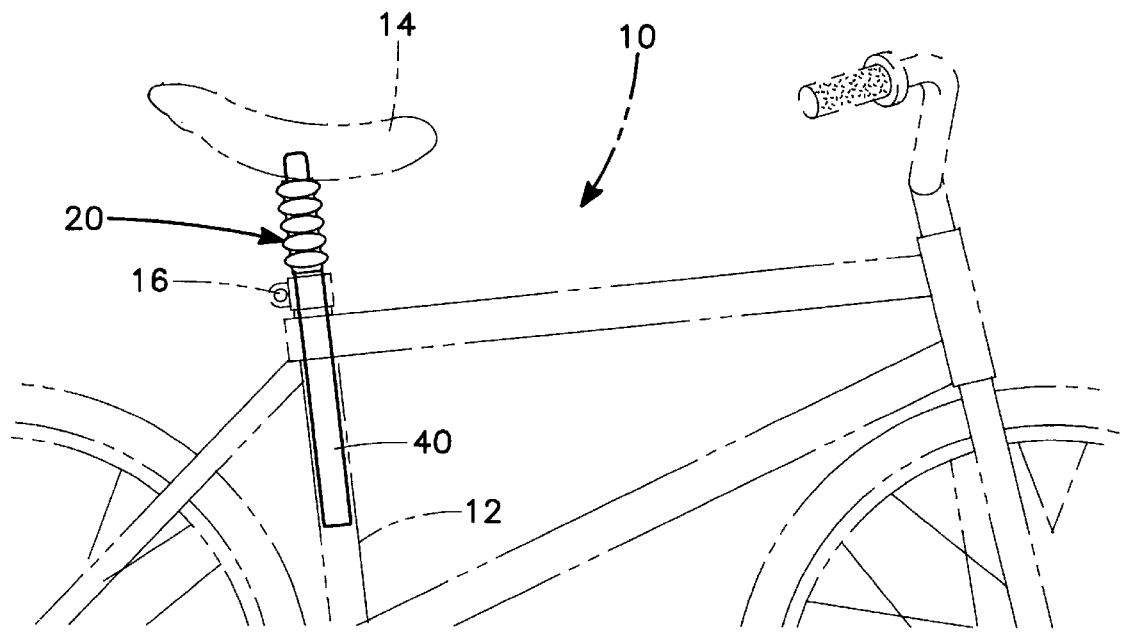
FIG. 1 is an elevation view which in dotted lines shows a bicycle, and in solid lines shows a spring support assembly in accordance with the invention.
Figure 6:
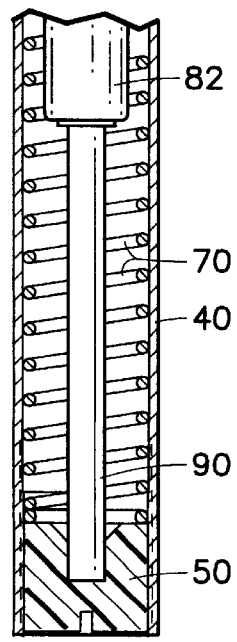
FIG. 6 is a slightly enlarged vertical cross-sectional view of the lower end portion of the lower post.

As shown only in dotted lines in FIG. 1, a bicycle 10 has a hollow frame member 12, a bicycle seat 14, and a clamp 16. A spring support assembly 20 according to the present invention has its lower end portion received within the hollow frame member 12, its upper end supporting the seat 14, and somewhat above its vertical center is clamped in place by the clamp 16. The clamp 16, shown only in dotted lines in FIG. 1, grasps the spring support assembly 20 to maintain a fixed position, both vertically and rotationally, of the lower post 40 of the support assembly 20 relative to the bicycle frame.

The spring support assembly or impact isolation system 20 includes an upper or inner post 30 and a hollow cylindrical outer or lower post 40, which receives the bottom portion of the upper post in a vertically slidable relation. It is the upper end portion of the lower post 40 that is secured to the bicycle frame by the clamp 16. A rubber bellows 24 provides a dirt cover enclosing the interface of the upper end of the lower post 40 with the upper post 30. As best seen in FIG. 3, the lower end of bellows 24 is secured about the outer periphery of the upper end of lower post 40, while its upper end is secured somewhat below the top of upper post 30.

The upper or inner post 30 has a top end 32 and a bottom end 34. The hollow cylindrical outer or lower post 40 has a top end 42 and bottom end 44. An elongated keyway 38 is provided in upper post 30, which in conjunction with a key slot 46 in lower post 40 and an alignment plug 65 serves to maintain the rotational position of upper post 30 relative to lower post 40 as the upper post moves up and down.

Figure 7:
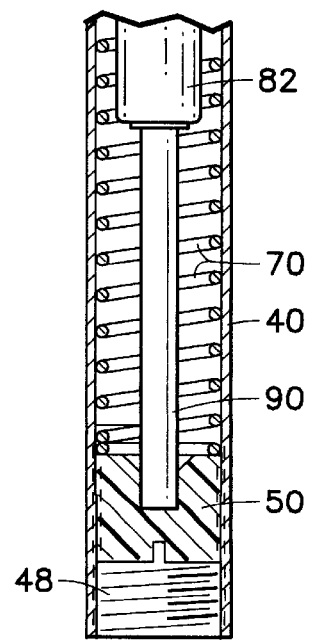
FIG. 7 is a view like FIG. 6, showing the adjustment plug moved inwardly of the post to shorten the springs.

An adjustment plug 50 is positioned within the lower end portion of lower post 40, which is internally threaded as shown at 48 in FIG. 7, receiving mating threads of the adjustment plug, not specifically shown. The upper end surface of adjustment plug 50 and the lower end 34 of top post 30 together define a spring chamber 60 within the lower post 40. According to the presently preferred embodiment of the invention a spring assembly located within the spring chamber and interposed between the bottom end of the inner post and the adjustment plug includes two different kinds of springs operating concurrently, or in parallel.

Thus the novel spring assembly provided in accordance with the present invention includes a gas spring 80 that has a cylindrical housing 82 and a plunger 90 extending longitudinally from one end of the housing, and a metallic spring 70 circumdisposed about the gas spring. The gas spring is pre-loaded to prevent reaction to shocks of less than a predetermined magnitude, and the gas spring and metallic spring together provide resilient support for the bicycle seat and any load imposed thereon. The gas spring serves to absorb any vibrations or oscillations that might otherwise occur during the rebound action of the metallic spring.

The gas spring 80 may be made in accordance with U.S. Pat. No. 3,656,593, or other later patents such as U.S. Pat. No. 5,273,259. It has a cylindrical housing 82 with an upper end 84 and a lower end 86, and a protrusion 88 on its top end; and a plunger 90 extending from the lower end of the cylindrical housing 82. Upper post 30 on its bottom end 34 has a centering hole 36 that receives the protrusion 88 on the top of the gas cylinder. Adjustment plug 50 has a centering hole 54 in its top surface that receives the downwardly protruding end of the plunger 90.

In the presently preferred embodiment of the invention the metallic spring 70 is a helically coiled steel spring, commonly known simply as a coil spring. Its upper end 72 abuts the lower end surface 34 of the upper post 30, and its lower end 74 abuts the upper surface of adjustment plug 50. Thus, the gas spring 80 is firmly retained in a centered position such that there will be no mutual interference between its operation and the operation of the metallic spring 70.

The coil spring 70 operates essentially in accordance with Hooke's law, compressing by a distance that is proportional to the compressive force that is applied to it. Unless pre-compressed, it would provide no pre-load. Its spring strength on rebound is the same as its spring strength while compressing in response to a load or impact force. It may have a tendency to oscillate, especially during rebound.

The gas spring 80 has an entirely different characteristic. A gas spring is selected that has a pre-load characteristic, such as a force of forty pounds required to start its compression. In its interior there is a piston connected to the internal end of the plunger, which must be sealed to the cylinder wall. The seal has a certain amount of static friction, so even though the pre-load force of the compressed nitrogen gas is set at forty pounds, the actual force required to start compression will likely be 48 pounds. The gas spring is also characterized by a very low value of spring strength; that is, once it has started to compress, the additional force required to move it each additional incremental distance is relatively small, especially as compared to the spring constant of the coil spring. The gas spring is also characterized by a slow rebound characteristic; that is, its controlled flow of hydraulic fluid through an orifice makes it recover at a predetermined rate.

According to the present invention the two unlike types of springs are sufficiently tied together in a parallel operation so that all of the phases of the spring reaction occur as a composite function of the two devices. That is, the effective pre-load will equal the pre-load of the gas spring, plus any pre-load that may have been placed in the coil spring by pre-compression. The effective spring strength will also be the sum of the two spring strengths. The rebound will be controlled mainly by the coil spring because its spring constant is selected to be at least several times as great as the spring constant of the gas spring. A relatively prompt rebound action will occur, but the tendency of the coil spring to oscillate will be offset by the gas spring.

It is significant that the ends of the two springs are confined by the respective ends of the spring chamber, and the gas spring is centered within the spring chamber so as to avoid any mutual interference in the operation.

The adjustment plug 50 allows an adjustment to be made in the length of the coil spring 70, and thus to assign a pre-load value to it. The characteristic of the gas spring is such that shortening the protruding length of the plunger as a static adjustment does not affect either the pre-load or the spring strength of the gas spring.

ALTERNATIVE FORMS

In accordance with the invention a wave spring may if desired be used in place of the coil spring. The wave spring consists of separate crinkled sections, which are stacked together in a vertical stack, each section having a central opening large enough to surround the cylinder 82.

Also in accordance with the invention, gas springs with higher pre-load settings may be used for a heavier rider. For example, a rider weighing 175 pounds may impose a weight of only 65 pounds on the bicycle seat. If the rider is heavier, a higher pre-load for the spring assembly may be desired.

While the invention has been disclosed with a metallic spring that is the same length as the gas spring, it is also feasible to use a shorter metallic spring. For example, the metallic spring may be co-extensive with only the protruding shaft or plunger of the gas spring.

For a person of very light weight, it may not be necessary to use the metallic spring in conjunction with the gas spring. The gas spring alone may provide sufficient spring strength for both the downward movement of the bicycle seat in response to an impact, and the upward movement on rebound or recovery.

While the presently preferred form of the invention has been disclosed in detail in order to comply with the patent laws, it will nevertheless be understood that the scope of the invention is to be determined only in accordance with the appended claims.

What I claim is:

1. A spring support assembly for a bicycle seat, comprising:
    a hollow cylindrical lower post having top and bottom ends, its bottom end being adapted to be slidably inserted into a bicycle frame member and clamped in a fixed position relative thereto;
    an upper post having top and bottom ends, its top end being adapted to have a bicycle seat fixedly secured thereto and its bottom end being adapted to be inserted into the top end of the lower post in vertically slidable relation therewith;

the upper post having an elongated keyway, the lower post having a cooperating key slot, and an alignment plug being disposed within both the keyway and the key slot so as to inhibit rotation of the upper post as it moves up and down;

a threaded adjustment plug in the bottom end of the lower post, its upper surface and the lower end surface of the upper post together defining a spring chamber within the lower post;

a gas spring disposed within the spring chamber, having a cylindrical housing with a protrusion on its top end, and a plunger extending downward from the lower end of the cylindrical housing;

the upper post on its bottom end having a centering hole that receives the protrusion at the top end of the gas cylinder, and the adjustment plug having a centering hole in its top surface that receives the downwardly protruding end of the plunger;

a metallic spring within the spring chamber circumdisposed about the gas spring;

the adjustment plug being removable to allow replacement of either spring;

the gas spring being pre-loaded to prevent reaction to a force of less than a predetermined magnitude, and the gas spring serving to absorb oscillations of the metallic spring that might otherwise occur during rebound action, so that all of the phases of the spring reaction occur as a composite function of the two devices.

\* \* \* \* \*